(12) United States Patent
Zhang

(10) Patent No.: US 11,371,854 B2
(45) Date of Patent: Jun. 28, 2022

(54) METHOD AND APPARATUS FOR PROCESSING TRANSIT TIME OF NAVIGATION PATH, DEVICE AND COMPUTER STORAGE MEDIUM

(71) Applicant: BAIDU ONLINE NETWORK TECHNOLOGY (BEIJING) CO., LTD., Beijing (CN)

(72) Inventor: Meng Zhang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 460 days.

(21) Appl. No.: 16/325,115

(22) PCT Filed: May 16, 2017

(86) PCT No.: PCT/CN2017/084514
§ 371 (c)(1),
(2) Date: Feb. 12, 2019

(87) PCT Pub. No.: WO2018/058969
PCT Pub. Date: Apr. 5, 2018

(65) Prior Publication Data
US 2021/0278226 A1 Sep. 9, 2021

(30) Foreign Application Priority Data
Sep. 30, 2016 (CN) .......................... 201610874055.4

(51) Int. Cl.
*G01C 21/34* (2006.01)
(52) U.S. Cl.
CPC ..... *G01C 21/3461* (2013.01); *G01C 21/3492* (2013.01)
(58) Field of Classification Search
None
See application file for complete search history.

(56) References Cited

U.S. PATENT DOCUMENTS 8,520,695 B1 * 8/2013 Rubin ............. G08G 1/096791
370/445
2004/0243301 A1 12/2004 Kim
(Continued)

FOREIGN PATENT DOCUMENTS

CN 1573837 A 2/2005
CN 101311676 A 11/2008
(Continued)

OTHER PUBLICATIONS

Extended European Search Report from EP app. No. 17854425.0, dated Aug. 1, 2019.
(Continued)

*Primary Examiner* — Khoi H Tran
*Assistant Examiner* — Tristan J Greiner
(74) *Attorney, Agent, or Firm* — Ladas & Parry, LLP

(57) ABSTRACT

The present disclosure provides a method and apparatus for processing transit time of a navigation path, a device and a computer storage medium. The method comprises: obtaining turning signs of target intersections in the navigation path in a current region as requested by a user and a request time period in which the user requests for navigation; determining time spent by the user in passing through the target intersections, according to the request time period, turning signs of the target intersections, a preset turning probability database and preset waiting time for respective turns; determining the transit time for the user to pass through the navigation path, according to the time spent by the user in passing through road segments in the navigation path and time spent in passing through the target intersections in the navigation path. The technical solution of the present disclosure can be employed to overcome drawbacks in the prior art, more accurately determine the time spent in passing through the target intersections in the navigation
(Continued)

path, and thereby more accurately determine the transit time of the navigation path.

3 Claims, 2 Drawing Sheets

(56) References Cited

U.S. PATENT DOCUMENTS

| | | | |
|---|---|---|---|
| 2008/0033636 | A1 | 2/2008 | Ryu et al. |
| 2008/0252484 | A1* | 10/2008 | Hopkins .......... G08G 1/096716 340/905 |
| 2010/0049428 | A1* | 2/2010 | Murata .............. G09B 29/007 701/533 |
| 2010/0312466 | A1 | 12/2010 | Katzer et al. |
| 2012/0010807 | A1 | 1/2012 | Zhou |
| 2015/0015421 | A1* | 1/2015 | Krijger ............ G08G 1/096716 340/932 |
| 2015/0204688 | A1* | 7/2015 | Gearhart ............ G01C 21/3679 701/540 |

FOREIGN PATENT DOCUMENTS

| | | |
|---|---|---|
| CN | 101614546 A | 12/2009 |
| CN | 106323318 A | 12/2009 |
| CN | 102042836 A | 5/2011 |
| CN | 102288193 A | 12/2011 |
| CN | 103295408 A | 9/2013 |
| CN | 105046956 A | 11/2015 |
| DE | 102015008263 A1 | 12/2015 |
| JP | 2008210249 A | 9/2008 |
| JP | 20100044256 A | 2/2010 |
| KR | 20040102478 A | 12/2004 |
| KR | 20150125405 A | 11/2015 |

OTHER PUBLICATIONS

Notice of Reasons for Refusal from JP app. No. 2018-566337, dated Feb. 12, 2020, with English translation from Global Dossier.
Notification of Reason for Refusal from KR app. No. 10-2018-7036594, dated Nov. 26, 2019, with English translation from Global Dossier.
Notice of Allowance from KR app. No. 10-2018-7036594, dated Feb. 18, 2020, with English translation from Global Dossier.
International Preliminary Report on Patentability from PCT/CN2017/084514, dated Apr. 2, 2019, with English translation from WIPO.
International Search Report for PCT/CN2017/084514 dated Aug. 3, 2017 and its English translation provided by WIPO.
Written Opinion of the International Search Authority for PCT/CN2017/084514 dated Aug. 3, 2017 and its English translation provided by Google Translate.
First Office action and search report translation for related Chinese Application 201610874055.4 (CN 106323318 ) provided by Google Translate dated Nov. 1, 2018.
Tianjin University of Technology postgraduate thesis: *Consider the node attribute car navigation system path planning Research* by Zhu Dandan , published in Jan. 2014.

* cited by examiner

METHOD AND APPARATUS FOR PROCESSING TRANSIT TIME OF NAVIGATION PATH, DEVICE AND COMPUTER STORAGE MEDIUM

CROSS-REFERENCE TO RELATED APPLICATIONS

The present application is the U.S. national phase of PCT Application No. PCT/CN2017/084514 filed on May 16, 2017, which claims priority to the Chinese Patent Application No. 201610874055.4 entitled "Method and Apparatus for Processing Transit Time of Navigation Path" filed on the filing date Sep. 30, 2016, the entire disclosures of which are hereby incorporated by reference in their entireties.

FIELD OF THE DISCLOSURE

The present disclosure relates to the technical field of navigation, and particularly to a method and apparatus for processing transit time of a navigation path.

BACKGROUND OF THE DISCLOSURE

With rapid development of computer technology, many applications used in electronic devices have emerged, and greatly facilitates people's lives.

For example, a navigation application is an application that is very frequently used in electronic devices in the prior art. When a user goes out, a driving path can be obtained by navigation, and greatly facilitates the user's life. In the existing navigation, when the user requests for a navigation path from a starting point to a finishing point, the navigation application can calculate at least two navigation paths for the user, and meanwhile calculate the transit time of each navigation path for the user. In the prior art, during determination of the transit time of the navigation path, the transit time at an intersection is directly totally placed in a road section as a green light without waiting, or as a red light with waiting.

In the calculation of the transit time of the navigation path in the prior art, since the traffic lights at intersections in the navigation path are all regarded as red lights or green lights, the acquired transit time of the navigation path is made very inaccurate.

SUMMARY OF THE DISCLOSURE

The present disclosure provides a method and apparatus for processing transit time of a navigation path, to improve accuracy in obtaining the transit time of the navigation path.

The present disclosure provides a method for processing transit time of a navigation path, the method comprising:

obtaining turning signs of target intersections in the navigation path in a current region as requested by a user, and a request time period in which the user requests for navigation;

determining time spent by the user in passing through the target intersections, according to the request time period, turning signs of the target intersections, a preset turning probability database and preset waiting time for respective turns;

determining the transit time for the user to pass through the navigation path, according to the time spent by the user in passing through road segments in the navigation path and time spent in passing through the target intersections in the navigation path.

Further optionally, in the above method, the step of determining time spent by the user in passing through the target intersections, according to the request time period, turning signs of the target intersections, a preset turning probability database and preset waiting time for respective turns specifically comprises:

obtaining turning probabilities of turns corresponding to turning signs at the target intersections, according to the request time period, turning signs of the target intersections, and the preset turning probability database;

determining time spent by the user in passing through the target intersections, according to the turning probabilities corresponding to turns at the target intersections, and the preset waiting time for the turns.

Further optionally, in the above method, before determining time spent by the user in passing through the target intersections, according to the request time period, turning signs of the target intersections, a preset turning probability database and preset waiting time for respective turns, the method further comprises:

establishing the preset turning probability database.

Further optionally, in the above method, the establishing the preset turning probability database specifically comprises:

obtaining a pass weight in each direction of each intersection in the current region in each time period, according to historical road condition data of the current region;

for each intersection in the current region in each time period, obtaining a turning probability in each direction of the corresponding intersection, according to the pass weight in each direction of the corresponding intersection and a length of a road segment in each direction;

storing the respective time periods, signs of the target intersections, turning probabilities in respective directions of the target intersections into a database in a correspondence relationship, and generating the preset turning probability database.

Further optionally, in the above method, the obtaining a pass weight in each direction of each intersection in the current region in each time period, according to historical road condition data of the current region specifically comprises:

according to historical road condition data of the current region, obtaining an average travel speed of vehicles in each direction of each intersection in the current region in each time period, as a pass weight in the corresponding direction.

The present disclosure further provides an apparatus for processing transit time of a navigation path, the apparatus comprising:

an obtaining module configured to obtain turning signs of target intersections in the navigation path in a current region as requested by a user, and a request time period in which the user requests for navigation;

a module for determining time spent at an intersection, configured to determine time spent by the user in passing through the target intersections, according to the request time period, turning signs of the target intersections, a preset turning probability database and preset waiting time for respective turns;

a transmit time determining module configured to determine the transit time for the user to pass through the navigation path, according to the time spent by the user in passing through road segments in the navigation path and time spent in passing through the target intersections in the navigation path.

Further optionally, in the above apparatus, the module for determining time spent at the intersection specifically comprises:

a turning probability obtaining unit configured to obtain turning probabilities of turns corresponding to turning signs at the target intersections, according to the request time period, turning signs of the target intersections, and the preset turning probability database;

a spent time determining unit configured to determine time spent by the user in passing through the target intersections, according to the turning probabilities corresponding to turns at the target intersections, and preset waiting time for turns.

Further optionally, the apparatus further comprises:

an establishing module configured to establish a preset turning probability database.

Further optionally, in the apparatus, the establishing module specifically comprises:

a pass weight obtaining unit configured to obtain a pass weight in each direction of each intersection in the current region in each time period, according to historical road condition data of the current region;

a turning probability obtaining unit configured to, for each intersection in the current region in each time period, obtain a turning probability in each direction of the corresponding intersection, according to the pass weight in each direction of the corresponding intersection and a length of a road segment in each direction;

a generating unit configured to store the respective time periods, signs of the target intersections, turning probabilities in respective directions of the target intersections into a database in a correspondence relationship, and generate the preset turning probability database.

Further optionally, in the apparatus, the pass weight obtaining unit is specifically configured to, according to historical road condition data of the current region, obtain an average travel speed of vehicles in each direction of each intersection in the current region in each time period, as a pass weight in the corresponding direction.

According to the method and apparatus of processing the transit time of the navigation path according to the present embodiment, it is possible to obtain turning signs of target intersections in the navigation path in a current region as requested by a user, and a request time period in which the user requests for navigation; determine time spent by the user in passing through the target intersections, according to the request time period, turning signs of the target intersections, a preset turning probability database and preset waiting time for respective turns; determine the transit time for the user to pass through the navigation path, according to the time spent by the user in passing through road segments in the navigation path and time spent in passing through the target intersections in the navigation path. The technical solution of the present embodiment can be employed to overcome drawbacks in the prior art, more accurately determine the time spent in passing through the target intersections in the navigation path, and thereby more accurately determine the transit time of the navigation path.

DETAILED DESCRIPTION OF PREFERRED EMBODIMENTS

The present disclosure will be described in detail with reference to figures and specific embodiments to make objectives, technical solutions and advantages of the present disclosure more apparent.

Figure 1:
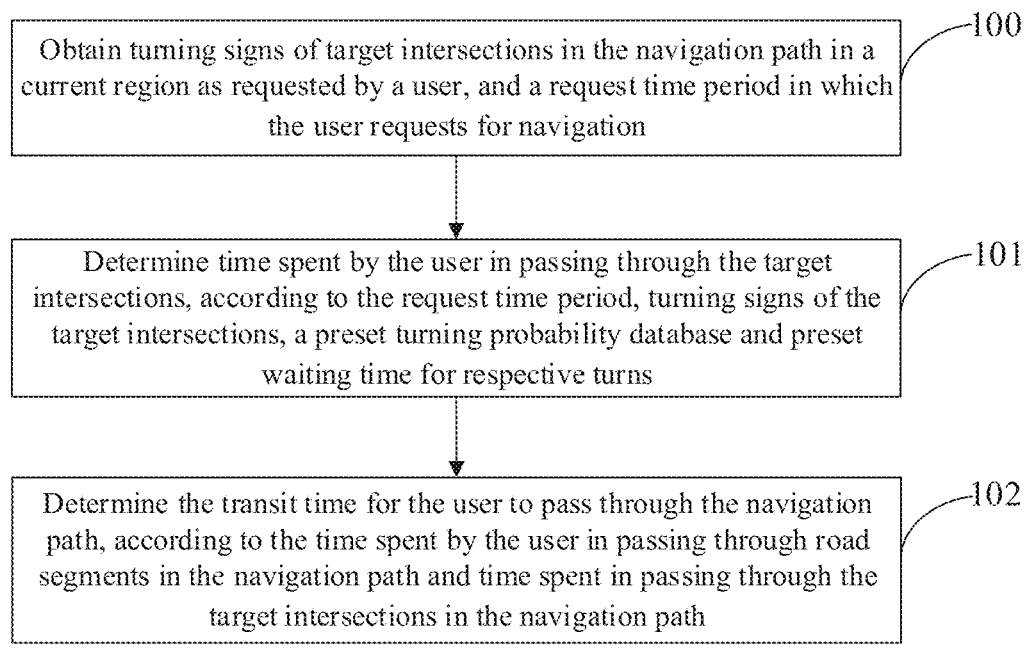
FIG. 1 is a flow chart of an embodiment of a method for processing transit time of a navigation path according to the present disclosure.

FIG. 1 is a flow chart of an embodiment of a method for processing transit time of a navigation path according to the present disclosure. As shown in FIG. 1, the method for processing the transit time of the navigation path according to the present embodiment may specifically include the following steps:

100: obtaining turning signs of target intersections in the navigation path in a current region as requested by a user, and a request time period in which the user requests for navigation;

101: determining time spent by the user in passing through the target intersections, according to the request time period, turning signs of the target intersections, a preset turning probability database and preset waiting time for respective turns;

102: determining the transit time for the user to pass through the navigation path, according to the time spent by the user in passing through road segments in the navigation path and time spent in passing through the target intersections in the navigation path.

A subject for executing the method for processing the transit time of the navigation path of the present embodiment is an apparatus for processing the transit time of the navigation path. The apparatus for processing the transit time of the navigation path may be specifically set in a navigation application. The navigation application of this embodiment can also be embedded in a map application or other applications. Alternatively, the navigation application can be directly installed in a mobile terminal or other electronic devices.

In order to facilitate information management and increase the navigation efficiency, the technical solution of the embodiment can be performed according to areas. The area of this embodiment may specifically refer to a city, or a certain area in a city. When the user requests for navigation in the current region, the navigation application first calculates the navigation path according to the starting point and the finishing point in the user's navigation request. Then, the apparatus for processing the transit time of the navigation path of the embodiment may acquire the navigation path, and obtain turning signs of target intersections in the navigation path, and the request time period in which the user requests for navigation. After the navigation path is determined, the turn of each target intersection passed in the navigation path is determined. The turning signs of the target intersections in this embodiment may be represented by respective words indicative of turning, for example, from east to west, from east to south, from south to west, from south to east, or the like. Alternatively, each turn can be uniquely identified by numbers or letters. For example, 1 identifies an east-west turn, 2 identifies an east-south turn, 3 identifies an east-to-north turn, 4 identifies an east-to-east turn, namely a U-turn, and so on, and each turn can be identified with a number or letter. Since the road conditions in the city are usually related to time periods of each day, for example, the traffic in an off-peak period is relatively smooth, the user turns left at a certain intersection; and in a peak period, when the left-turning road condition at the same intersection is relatively congested, the user's turn may not be leftward turn, but travel straight forward. Hence, road conditions and turns at different time periods might be different, which affects determination of the transmit time of the navigation path. Hence, in the present embodiment, it is necessary to obtain the request time period in which the user requests for navigation upon determining final transmit time of the navigation path. The time period in the present embodiment may be set according to road conditions of the city where the user lies. For example, it is specifically possible to divide a day into a plurality of time periods, and it is specifically possible to set every two hours as a time period, for example, 7:00-9:00, 9:00-11:00, and so on so forth. It is possible to set 23:00-0:00 and 0:00-1:00 as a time period. In practical application, time periods may be divided according to other segments. Specifically, the duration included in each time period might be the same or different. For example, it is possible to set 7:00-10:00 am as a time period, and set 10:00-12:00 as a time period.

Then, in the present embodiment, it is possible to determine time spent by the user in passing through the target intersections, according to the request time period, turning signs of the target intersections, a preset turning probability database and preset waiting time for respective turns. The preset turning probability database may include turning probabilities of all turns in all time periods at all intersections of the current region. Therefore, further optionally, on the basis of the technical solution of the above embodiment, step 100 "determining time spent by the user in passing through the target intersections, according to the request time period, turning signs of the target intersections, a preset turning probability database and preset waiting time for respective turns" may specifically comprise the following steps:

(a1) obtaining turning probabilities of turns corresponding to turning signs at the target intersections, according to the request time period, turning signs of the target intersections, and the preset turning probability database;

(a2) determining time spent by the user in passing through the target intersections, according to the turning probabilities corresponding to turns at the target intersections; and preset waiting time for turns.

Specifically, it is possible to obtain turning probabilities of turns corresponding to turning signs at the target intersections from the preset turning probability database, according to the request time period and the turning signs of the target intersections; then for the turn at each target intersection, multiply the turning probability corresponding to the turn at the target intersection by the preset waiting time for the turn, to obtain the time spent by the user in passing through the target intersection. It needs to be appreciated that the preset waiting time for each intersection may be preset by a traffic administration authority of the current region.

Further optionally, on the basis of the technical solution of the above embodiment, before the step 100 "determining time spent by the user in passing through the target intersections, according to the request time period, turning signs of the target intersections, a preset turning probability database and preset waiting time for respective turns", the method may further comprise: establishing a preset turning probability database.

For example, optionally, the step "establishing a preset turning probability database" in the above embodiment may specifically comprise the following step:

(b1) obtaining a pass weight in each direction of each intersection in the current region in each time period, according to historical road condition data of the current region;

For example, the step may specifically comprise: according to the historical road condition data of the current region, obtaining an average travel speed of vehicles in each direction of each intersection in the current region in each time period, as a pass weight in a corresponding direction. The historical road condition data of the current region may specifically comprise travel speeds of vehicles at each road segment in the current region. As such, it is possible to average travel speeds of vehicles in a direction of the intersection in a time period to obtain the pass weight in the direction of the intersection in the time period. If a difference of pass weights of two road segments (links) is larger, this indicates that a probability that a vehicle stream of the first link turns towards the second link is smaller; if the difference of pass weights of the two links is smaller, this indicates that a probability that a vehicle stream of the first link turns towards the second link is larger.

(b2) for each intersection in the current region in each time period, obtaining a turning probability in each direction of the corresponding intersection, according to the pass weight in each direction of the corresponding intersection and a length of a road segment in each direction;

For example, the turning probability in each direction of the intersection of the present embodiment may be obtained through four equation sets. In the present embodiment, four roads are connected at each intersection, and each road has two directions; assuming $A_i$ represents the $i^{th}$ road, $A_{0i}$ represents a vehicle flow on a road in a direction which the vehicle travels towards the intersection in the $i^{th}$ road, $A_{1i}$ represent a vehicle flow on a road in a direction which the vehicle travels away from the intersection in the $i^{th}$ road; and $a_{ij}$ represents a turning probability that the $i^{th}$ road turns towards the $j^{th}$ road. $L_{0i}$ represents a length of the $i^{th}$ road, and specifically refers to a length of a road segment (link) in most proximity with the intersection, and $\omega_{0i}$ represents a weight on a road in a direction which the vehicle travels towards the intersection in the $i^{th}$ road; $\beta$ is a coefficient obtained by performing experiments, and represents a relationship between the pass weight and the flow, and may be obtained through many times of experiments according to the historical road condition data.

The following equation may be obtained according to the above depictions:

$$\sum_{1<=i<=4, i \neq j} a_{ij} A_{0i} = A_{1j}$$

where $$A_{0i} = \beta \times L_{0i} / \omega_{0i}$$

$$A_{1i} = \beta \times L_{1i} / \omega_{1i}$$

Since $1<=i<=4$, $1<=j<=4$, $i \neq j$, this indicates that there exist a total of four rows in the matrix, and each row is $a_{ij} A_{0i} = A_{1j}$.

For a travel direction of the intersection, it is possible to obtain, from the above equations, an equation set including the above four equations, wherein the equation set includes turning probabilities in four directions, and each turning probability is an unknown number. The turning probability in each direction may be solved according to the equation set.

As known from the above, it is possible to obtain the turning probability in each direction of all intersections of the current region.

(b3) storing respective time periods, signs of the target intersections, turning probabilities in respective directions of the target intersections in the database in a correspondence relationship, and generating a preset turning probability database.

Finally, information of all intersections obtained above are stored in a correspondence relationship of the time periods, signs of intersections and turning probabilities of respective directions of the intersections, to generate the preset turning probability database.

The technical solution of the above embodiment may be employed to more accurately obtain time spent in passing through the target intersections in the navigation path, and the time spent in respective road segments in the navigation path may be determined according to a passing speed of the road segment. Then, it is possible to add up the time spent by the user in passing through the road segment in the navigation path and the time spent in passing through the target intersections in the navigation path, to obtain the user's transit time in the navigation path.

According to the method of processing the transit time of the navigation path according to the present embodiment, it is possible to obtain turning signs of target intersections in the navigation path in a current region as requested by a user, and a request time period in which the user requests for navigation; determine time spent by the user in passing through the target intersections, according to the request time period, turning signs of the target intersections, a preset turning probability database and preset waiting time for respective turns; determine the transit time for the user to pass through the navigation path, according to the time spent by the user in passing through road segments in the navigation path and time spent in passing through the target intersections in the navigation path. The technical solution of the present embodiment can be employed to overcome drawbacks in the prior art, more accurately determine the time spent in passing through the target intersections in the navigation path, and thereby more accurately determine the transit time of the navigation path.

Figure 2:
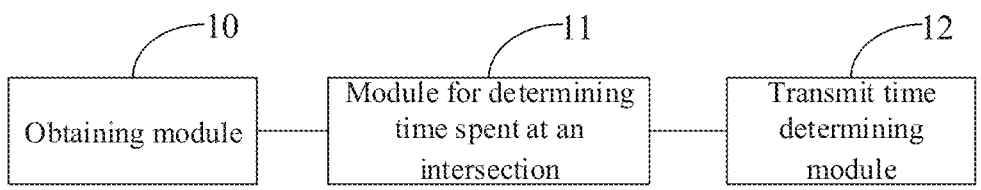
FIG. 2 is a structural diagram of a first embodiment of an apparatus for processing transit time of a navigation path according to the present disclosure.

FIG. 2 is a structural diagram of a first embodiment of an apparatus for processing transit time of a navigation path according to the present disclosure. As shown in FIG. 2, the apparatus for processing transit time of a navigation path according to the present embodiment may specifically comprise: an obtaining module 10, a module 11 for determining time spent at an intersection, and a transmit time determining module 12.

The obtaining module 10 is configured to obtain turning signs of target intersections in the navigation path in a current region as requested by a user, and a request time period in which the user requests for navigation; the module 11 for determining time spent at an intersection is configured to determine time spent by the user in passing through the target intersections, according to the request time period and turning signs of the target intersections obtained by the obtaining module 10, a preset turning probability database and preset waiting time for respective turns; the transmit time determining module 12 is configured to determine the transit time for the user to pass through the navigation path, according to the time spent by the user in passing through road segments in the navigation path and time spent in passing through the target intersections in the navigation path as obtained by the module 11 for determining time spent at the intersection.

Principles employed by the apparatus for processing the transit time of the navigation path according to the present embodiment to implement the processing of the transit time of the navigation path by using the above modules and the resultant technical effects are the same as those of the above-mentioned method embodiments. For particulars, please refer to the depictions of the aforesaid relevant method embodiments, and no detailed depictions will be presented here.

Figure 3:
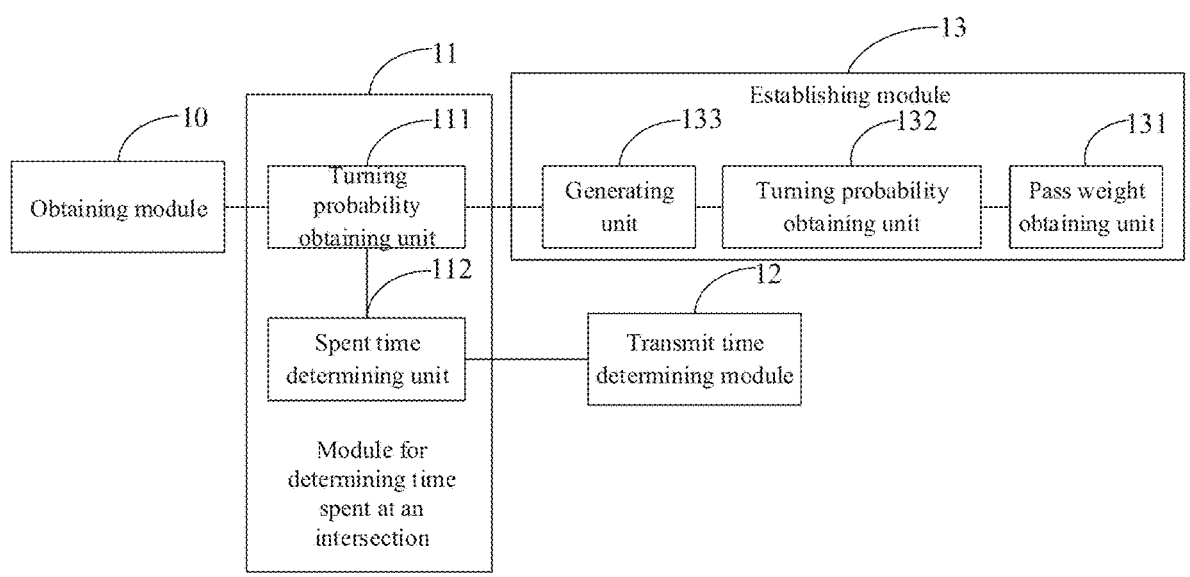
FIG. 3 is a structural diagram of a second embodiment of an apparatus for processing transit time of a navigation path according to the present disclosure.

FIG. 3 is a structural diagram of a second embodiment of an apparatus for processing transit time of a navigation path according to the present disclosure. As shown in FIG. 3, the apparatus for processing transit time of the navigation path according to the present embodiment may further includes the following technical solution on the basis of the technical solution of the embodiment shown in FIG. 2.

As shown in FIG. 3, in the apparatus for processing transit time of the navigation path according to the present embodiment, the module 11 for determining time spent at the intersection specifically comprises:

a turning probability obtaining unit 111 configured to obtain turning probabilities of turns corresponding to turning signs at the target intersections, according to the request time period, turning signs of the target intersections, and the preset turning probability database;

a spent time determining unit 112 configured to determine time spent by the user in passing through the target intersections, according to the turning probabilities corresponding to turns at the target intersections obtained by the turning probability obtaining unit 111; and preset waiting time for turns.

Correspondingly, the spent time determining module 12 is configured to determine the transit time for the user to pass through the navigation path, according to the time spent by the user in passing through road segments in the navigation path and time spent in passing through the target intersections in the navigation path determined by the spent time determining unit 112.

Further optionally, as shown in FIG. 3, the apparatus for processing transit time of the navigation path according to the present embodiment further comprises: an establishing module 13. The establishing module 13 is configured to establish a preset turning probability database.

Further optionally, in the apparatus for processing transit time of the navigation path according to the present embodiment, the establishing module 13 specifically comprises:

a pass weight obtaining unit 131 configured to obtain a pass weight in each direction of each intersection in the current region in each time period, according to historical road condition data of the current region;

a turning probability obtaining unit 132 configured to, for each intersection in the current region in each time period, obtain a turning probability in each direction of the corresponding intersection, according to the pass weight in each direction of the corresponding intersection obtained by the pass weight obtaining unit 131 and a length of a road segment in each direction;

a generating unit 133 configured to store respective time periods, signs of the target intersections, turning probabilities in respective directions of the target intersections obtained by the turning probability obtaining unit 132 in the database in a correspondence relationship, and generate a preset turning probability database.

At this time, correspondingly, the turning probability obtaining unit 111 is further connected with the generating unit 133, the turning probability obtaining unit 111 is configured to obtain turning probabilities of turns corresponding to turning signs at the target intersections, according to the request time period, turning signs of the target intersections obtained by the obtaining module 10, and the preset turning probability database generated by the generating unit 133.

Further optionally, in the apparatus for processing transit time of the navigation path according to the present embodiment, the pass weight obtaining unit 131 is specifically configured to, according to historical road condition data of the current region, obtain an average travel speed of vehicles in each direction of each intersection in the current region in each time period, as a pass weight in a corresponding direction.

Principles employed by the apparatus for processing the transit time of the navigation path according to the present embodiment to implement the processing of the transit time of the navigation path by using the above modules and the resultant technical effects are the same as those of the above-mentioned method embodiments. For particulars, please refer to the depictions of the aforesaid relevant method embodiments, and no detailed depictions will be presented here.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for processing transit time of a navigation path, wherein the method comprises:
obtaining turning guidance indications of target intersections in the navigation path in a current region as requested by a user, and a request time period in which the user requests for navigation, where a turning refers to a change of one or more traffic signals from one guidance indication to another at an intersection;
determining time spent by the user in passing through the target intersections, according to the request time period, turning guidance indications of the target intersections, a preset database of turning probability and preset waiting time for respective turnings;
determining the transit time for the user to pass through the navigation path, according to the time spent by the user in passing through road segments in the navigation path and time spent in passing through the target intersections in the navigation path,
wherein the step of determining time spent by the user in passing through the target intersections, according to the request time period, turning guidance indications of the target intersections, a preset database of turning probability and preset waiting time for respective turnings specifically comprises:
obtaining turning probabilities of turnings corresponding to turning guidance indications at the target intersections, according to the request time period, turning guidance indications of the target intersections, and the preset database of turning probability;
determining time spent by the user in passing through the target intersections, according to the turning probabilities corresponding to turnings at the target intersections, and the preset waiting time for the turnings,
wherein before determining time spent by the user in passing through the target intersections, according to the request time period, turning guidance indications of the target intersections, a preset database of turning probability and preset waiting time for respective turnings, the method further comprises:
establishing the preset database of turning probability,
wherein the establishing the preset database of turning probability specifically comprises:
according to historical road condition data of the current region, obtaining an average travel speed of vehicles in each direction of each intersection in the current region in each time period, as a pass weight in the corresponding direction;
for each intersection in the current region in each time period, obtaining a turning probability in each direction of the corresponding intersection, according to the pass weight in each direction of the corresponding intersection and a length of a road segment in each direction, wherein four roads are connected at each intersection, and each road has two directions, and the turning probability in each direction is solved according to the equation set below:

$$\sum_{1<=i<=4, i \neq j} a_{ij} A_{0i} = A_{1j}$$

where $$A_{0i} = \beta \times L_{0i} / \omega_{0i}$$

$$A_{1i} = \beta \times L_{1i} / \omega_{1i}$$

where $A_i$ represents the $i^{th}$ road, $A_{0i}$ represents a vehicle flow on a road in a direction which the vehicle travels towards the intersection in the $i^{th}$ road, $A_{1i}$ represent a vehicle flow on a road in a direction which the vehicle travels away from the intersection in the $i^{th}$ road; and $a_{ij}$ represents a turning probability that the $i^{th}$ road turns towards the $j^{th}$ road, $L_{0i}$ represents a length of the $i^{th}$ road, and specifically refers to a length of a road segment (link) in most proximity with the intersection, and $\omega_{0i}$ represents a weight on a road in a direction which the vehicle travels towards the intersection in the $i^{th}$ road; $\beta$ is a coefficient obtained by performing experiments, and represents a relationship between the pass weight and the flow;

storing the respective time periods, signs of the target intersections, turning probabilities in respective directions of the target intersections into a database in a correspondence relationship, and generating the preset database of turning probability.

2. A device, comprising:

one or more processors;

a memory;

one or more programs stored in the memory and configured to, when executed by said one or more processors, perform:

obtaining turning guidance indications of target intersections in the navigation path in a current region as requested by a user, and a request time period in which the user requests for navigation, where a turning refers to a change of one or more traffic signals from one guidance indication to another at an intersection;

determining time spent by the user in passing through the target intersections, according to the request time period, turning guidance indications of the target intersections, a preset database of turning probability and preset waiting time for respective turnings;

determining the transit time for the user to pass through the navigation path, according to the time spent by the user in passing through road segments in the navigation path and time spent in passing through the target intersections in the navigation path, wherein the step of determining time spent by the user in passing through the target intersections, according to the request time period, turning guidance indications of the target intersections, a preset database of turning probability and preset waiting time for respective turnings specifically comprises:

obtaining turning probabilities of turnings corresponding to turning guidance indications at the target intersections, according to the request time period, turning guidance indications of the target intersections, and the preset database of turning probability;

determining time spent by the user in passing through the target intersections, according to the turning probabilities corresponding to turnings at the target intersections, and the preset waiting time for the turnings, wherein before determining time spent by the user in passing through the target intersections, according to the request time period, turning guidance indications of the target intersections, a preset database of turning probability and preset waiting time for respective turnings, the method further comprises:

establishing the preset database of turning probability, wherein the establishing the preset database of turning probability specifically comprises:

according to historical road condition data of the current region, obtaining an average travel speed of vehicles in each direction of each intersection in the current region in each time period, as a pass weight in the corresponding direction;

for each intersection in the current region in each time period, obtaining a turning probability in each direction of the corresponding intersection, according to the pass weight in each direction of the corresponding intersection and a length of a road segment in each direction, wherein four roads are connected at each intersection, and each road has two directions, and the turning probability in each direction is solved according to the equation set below:

$$\sum_{1<=i<=4, i\neq j} a_{ij} A_{0i} = A_{1j}$$

where $$A_{0i} = \beta \times L_{0i} / \omega_{0i}$$

$$A_{1i} = \beta \times L_{1i} / \omega_{1i}$$

where $A_i$ represents the $i^{th}$ road, $A_{0i}$ represents a vehicle flow on a road in a direction which the vehicle travels towards the intersection in the $i^{th}$ road, $A_{1i}$ represent a vehicle flow on a road in a direction which the vehicle travels away from the intersection in the $i^{th}$ road; and $a_{ij}$ represents a turning probability that the $i^{th}$ road turns towards the $j^{th}$ road, $L_{0i}$ represents a length of the $i^{th}$ road, and specifically refers to a length of a road segment (link) in most proximity with the intersection, and $\omega_{0i}$ represents a weight on a road in a direction which the vehicle travels towards the intersection in the $i^{th}$ road; $\beta$ is a coefficient obtained by performing experiments, and represents a relationship between the pass weight and the flow;

storing the respective time periods, signs of the target intersections, turning probabilities in respective directions of the target intersections into a database in a correspondence relationship, and generating the preset database of turning probability.

3. A non-transitory computer storage medium encoded with a computer program, the program, when executed by one or more computers, enabling said one or more computers to execute the following operations:

obtaining turning guidance indications of target intersections in the navigation path in a current region as requested by a user, and a request time period in which the user requests for navigation, where a turning refers to a change of one or more traffic signals from one guidance indication to another at an intersection;

determining time spent by the user in passing through the target intersections, according to the request time period, turning guidance indications of the target intersections, a preset database of turning probability and preset waiting time for respective turnings;

determining the transit time for the user to pass through the navigation path, according to the time spent by the user in passing through road segments in the navigation path and time spent in passing through the target intersections in the navigation path, wherein the step of determining time spent by the user in passing through the target intersections, according to the request time period, turning guidance indications of the target intersections, a preset database of turning probability and preset waiting time for respective turnings specifically comprises:

obtaining turning probabilities of turnings corresponding to turning guidance indications at the target intersections, according to the request time period, turning guidance indications of the target intersections, and the preset database of turning probability;

determining time spent by the user in passing through the target intersections, according to the turning probabilities corresponding to turnings at the target intersections, and the preset waiting time for the turnings, wherein before determining time spent by the user in passing through the target intersections, according to the request time period, turning guidance indications of the target intersections, a preset database of turning probability and preset waiting time for respective turnings, the method further comprises:

establishing the preset database of turning probability, wherein the establishing the preset database of turning probability specifically comprises:

according to historical road condition data of the current region, obtaining an average travel speed of vehicles in each direction of each intersection in the current region in each time period, as a pass weight in the corresponding direction;

for each intersection in the current region in each time period, obtaining a turning probability in each direction of the corresponding intersection, according to the pass weight in each direction of the corresponding intersection and a length of a road segment in each direction, wherein four roads are connected at each intersection, and each road has two directions, and the turning probability in each direction is solved according to the equation set below:

$$\sum_{1<=i<=4, i \neq j} a_{ij} A_{0i} = A_{1j}$$

-continued where $$A_{0i} = \beta \times L_{0i} / \omega_{0i}$$

$$A_{1i} = \beta \times L_{1i} / \omega_{1i}$$

where $A_i$ represents the $i^{th}$ road, $A_{0i}$ represents a vehicle flow on a road in a direction which the vehicle travels towards the intersection in the $i^{th}$ road, $A_{1i}$ represent a vehicle flow on a road in a direction which the vehicle travels away from the intersection in the $i^{th}$ road; and $a_{ij}$ represents a turning probability that the $i^{th}$ road turns towards the $j^{th}$ road, $L_{0i}$ represents a length of the $i^{th}$ road, and specifically refers to a length of a road segment (link) in most proximity with the intersection, and $\omega_{0i}$ represents a weight on a road in a direction which the vehicle travels towards the intersection in the $i^{th}$ road; $\beta$ is a coefficient obtained by performing experiments, and represents a relationship between the pass weight and the flow;

storing the respective time periods, signs of the target intersections, turning probabilities in respective directions of the target intersections into a database in a correspondence relationship, and generating the preset database of turning probability.

\* \* \* \* \*